F. A. BRADLEY.
TOP PROP FOR CARRIAGES.
No. 114,909. Patented May 16, 1871.
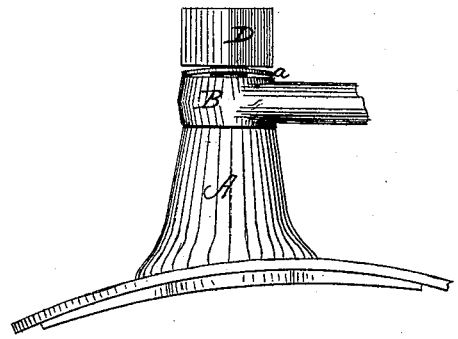
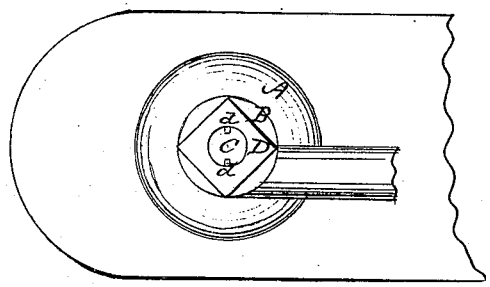
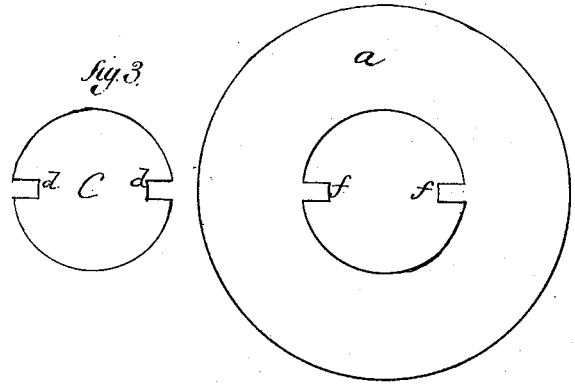

United States Patent Office.

FREDERICK A. BRADLEY, OF NEW HAVEN, CONNECTICUT, ASSIGNOR TO O. B. NORTH & CO., OF SAME PLACE.

Letters Patent No. 114,909, dated May 16, 1871.

---

IMPROVEMENT IN TOP-PROPS FOR CARRIAGES.

The Schedule referred to in these Letters Patent and making part of the same.

---

*To all whom it may concern:*

Be it known that I, FREDERICK A. BRADLEY, of New Haven, in the county of New Haven and State of Connecticut, have invented a new Improvement in Top-Props for Carriages; and I do hereby declare the following, when taken in connection with the accompanying drawing and the letters of reference marked thereon, to be a full, clear, and exact description of the same, and which said drawing constitutes part of this specification, and represents, in—

Figure 1, a side view;
Figure 2, an end view;
Figure 3, an end view of the bolt; and in
Figure 4, a top view of the washer.

This invention relates to an improvement in the article known as "top-props"—that is to say, the stud which is arranged on the bows of carriage tops to form the joint of the braces.

As commonly constructed, a nut is arranged on the end of the bolt, bearing directly upon the face of the brace end, and in use this nut is often loosened and lost.

The object of my invention is to overcome this difficulty; and

It consists in forming one or more grooves on the side of the bolt, and the arrangement of a washer between the joint end and the nut, the said washer provided with a tongue or tongues corresponding to the grooves in the bolt, which prevent the washer from turning, and thus serve to hold the nut and prevent its accidental removal.

A is the base, of any common construction;

B, the joint end;
a, the washer;
D, the nut; and
C, the bolt.

I construct the bolt with one or more longitudinal grooves, d. (See figs. 2 and 3.)

The washer a is perforated to pass on over the bolt, leaving tongues f corresponding to the grooves in the bolt, which tongues, when the washer is set onto the bolt, pass down the grooves d.

The brace end B is set onto the stud in the usual manner. Then over this the washer a is placed, and the nut screwed down onto the washer to give the requisite adjustment.

As the brace end turns, in throwing back or raising the top, it moves between the washer and the stud, and, as the washer cannot turn, the nut is also prevented from turning.

For the purpose of making the bearing free, and yet prevent rattling, I crown the washer, as denoted in fig. 1, thereby giving to it a slight elasticity.

I claim as my invention—

In top-props for carriages, the arrangement, between the nut and joint end, of the washer a provided with the tongue or tongues f, and the bolt constructed with corresponding grooves d, as and for the purpose specified.

F. A. BRADLEY.

Witnesses:
A. J. TIBBITS,
JOHN H. SHUMWAY.